United States Patent Office 3,135,398
Patented June 2, 1964

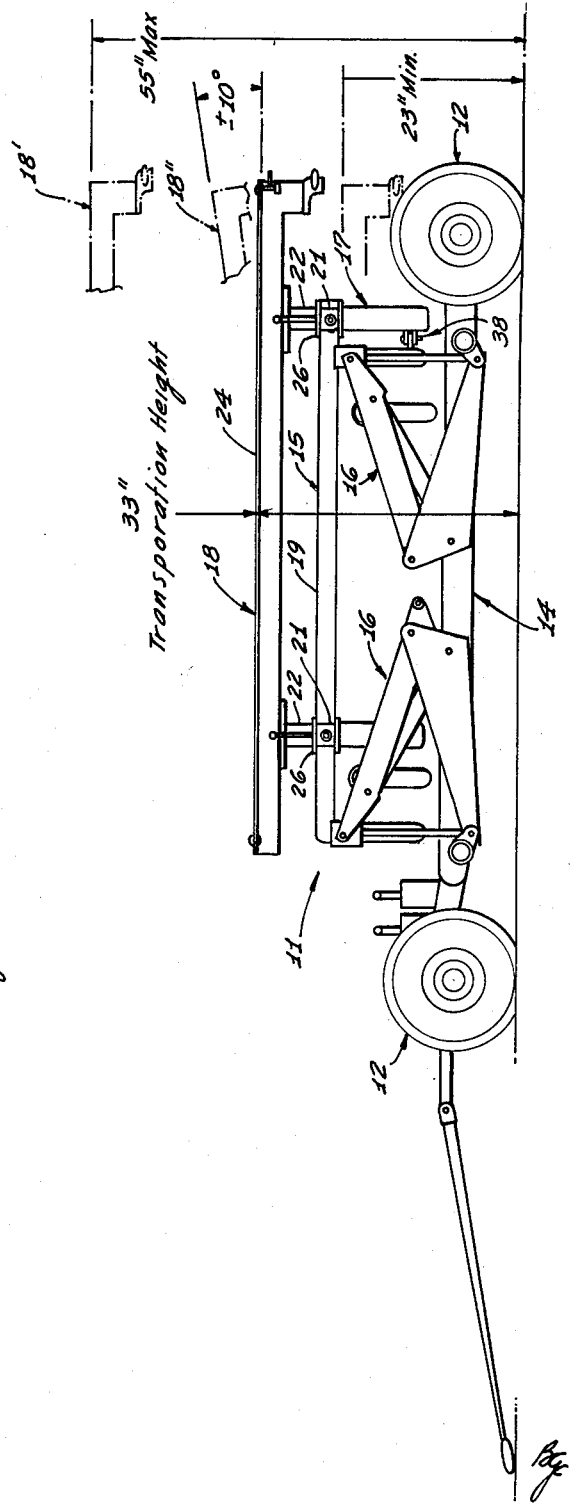

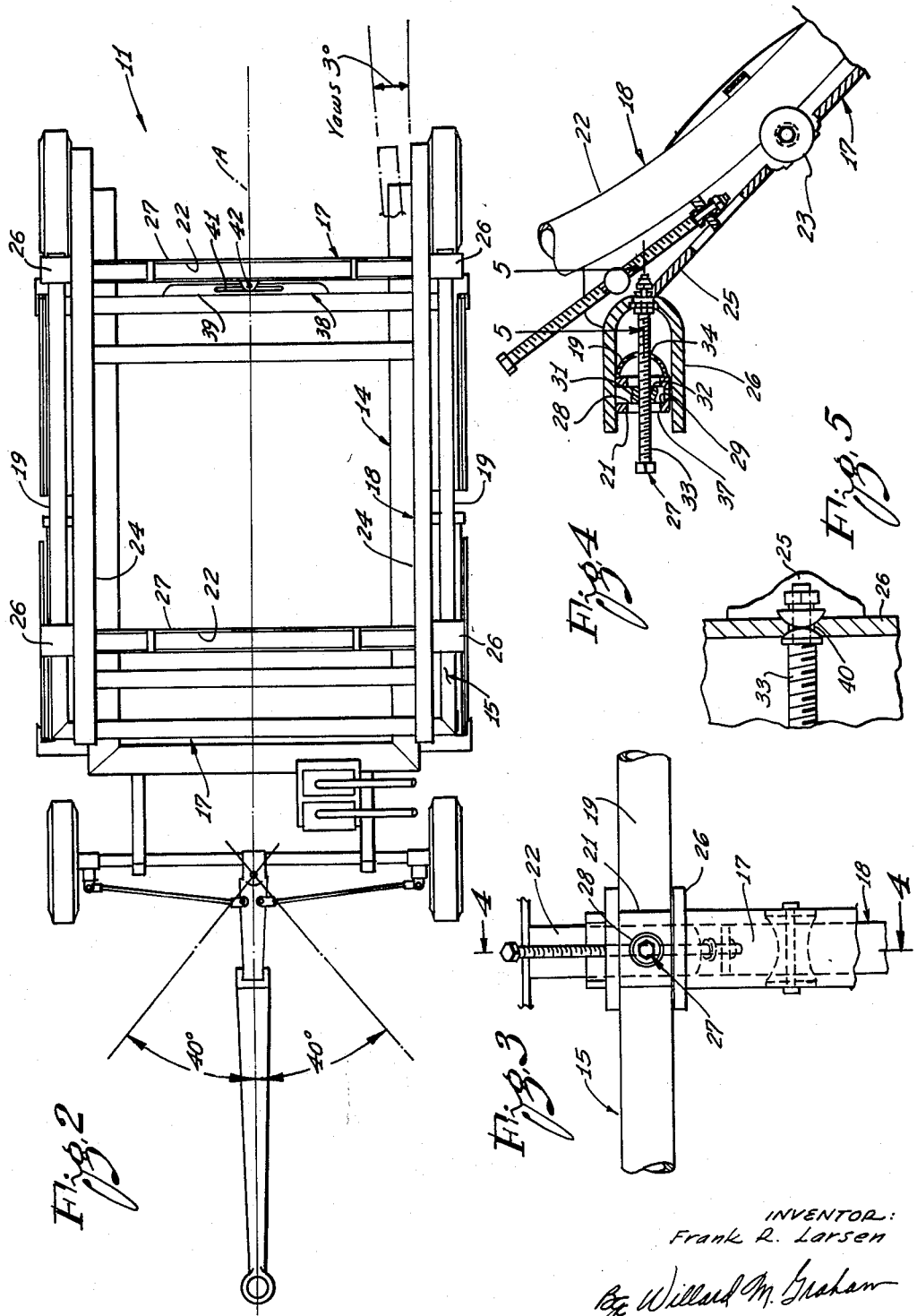

3,135,398
ELEVATING TRAILERS
Frank R. Larsen, Temple City, Calif., assignor, by mesne assignments, to Northrop Corporation, Beverly Hills, Calif., a corporation of California
Filed May 31, 1961, Ser. No. 113,952
4 Claims. (Cl. 214—1)

This invention relates to material handling equipment and more particularly to equipment of the above type symmetrically constructed about a longitudinal axis embodying structure enabling lateral and yaw movements to be imparted to components mounted on the equipment.

For purposes of illustration the structure disclosed herein is shown and described in connection with an elevating type trailer. Trailers of the above type are especially useful in installing, removing and replacing aircraft components. However, the structure disclosed herein may be utilized to install or remove parts constituting components of assemblies or equipment other than aircraft.

It is common practice in the airframe and like industries to orient or adjust a component so that it has a proper relation with respect to structure on which it is to be mounted, if its installation is to be effected with a minimum of effort. The same is true in removing components from an aircraft, however, in the case of a removal operation the equipment, adapted to receive the component, must be properly positioned and oriented prior to receiving the component. The present invention pertains to structure making possible the features discussed above insofar as lateral and yaw movements of components are concerned.

As previously stated the present invention is disclosed in connection with an elevating trailer or dolly. Briefly the trailer includes an elevating frame assembly on which carriage and cradle assemblies are mounted. Means adapted to impart lateral and yaw movements to components carried by the trailer include U-shaped members mounted on the sides of the carriage assembly. The U-shaped members embrace side members of the frame assembly thus providing support for the carriage and cradle assemblies. The U-shaped members are movable with respect to the side members to provide means whereby yaw and lateral movements may be imparted to the carriage and cradle assemblies and in turn to components mounted thereon. The U-shaped members of the frame include mechanical means for imparting and controlling yaw and lateral movements of the carriage and cradle assembly.

Accordingly it is an object of the present invention to provide material handling equipment embodying structure adapted to impart yaw and lateral movements to components mounted on the equipment.

Another object is to provide structure adapted to impart yaw and lateral movements to components mounted on material handling equipment which is simple in design yet rugged in construction, economical to manufacture, and which may be readily adapted to various installations.

FIGURES 1 and 2 are side and plan views, respectively, of an elevating type trailer embodying structure as disclosed herein functioning to permit yaw and lateral movements to be imparted to components carried by the trailer.

FIGURE 3 is an enlarged fragmentary side view of the trailer shown in FIGURES 1 and 2, FIGURE 3 showing components of the trailer whereby yaw and lateral movements may be imparted to components carried by the trailer.

FIGURE 4 is a sectional view of the structure shown in FIGURE 3, the section being taken on the line 4—4 of FIGURE 3.

FIGURE 5 is a sectional view taken on the line 5—5 of FIGURE 4.

Referring to the drawings, FIGURE 1 shows an elevating type trailer 11 embodying structure as disclosed herein adapted to impart yaw and lateral movements to components mounted on the trailer. The trailer 11 is used for purposes of illustration only, it should be understood that structure as disclosed herein may also be used with other types of material handling equipment. The construction and operating characteristics of the trailer 11 is quite similar to the elevating trailer disclosed in U.S. Patent No. 2,896,909 except for structure adapted to impart yaw and lateral movements to components mounted thereon. Accordingly features of construction which are common to the trailer 11 and the trailer shown in U.S. Patent No. 2,896,909 will not be described in detail in this specification.

The trailer 11 is rendered mobile by wheel assemblies 12 and includes lower and upper frame assemblies 14 and 15, respectively, secured together by means of four elevating mechanisms 16—16. A carriage assembly 17 and a cradle assembly 18 are mounted on the upper frame assembly 15 in a manner to be described in detail as the specification progresses. The above components are similar to those shown and described in the aforementioned patent with the exception of structure mounting the cradle assembly 18 on the upper frame assembly 15, this structure functioning to impart lateral and yaw movements to components carried by the trailer 11. In describing the trailer 11 it is sufficient to point out that the elevating mechanisms 16—16 are hydraulically operated and when actuated function to move the assemblies 17 and 18 between a lowered position, shown by solid construction in FIGURE 1, and an elevated position shown by broken line construction and indicated by the numeral 18' in FIGURE 1. The elevating mechanisms 16, when actuated in a specific manner, also function to impart pitch to components mounted on the trailer 11 as indicated by the numeral 18" in FIGURE 1. Roll movements are imparted to components carried by the trailer 11 by the same or similar structure as that disclosed in the aforementioned patent.

By referring to FIGURE 2 it will be seen that the trailer 11 is symmetrically constructed with respect to its longitudinal axis, the axis being identified by the letter A. It will also be seen that the carriage and cradle assemblies 17 and 18 have a generally rectangular configuration as viewed in FIGURE 2. The upper frame assembly 15 includes a pair of side members 19—19 having a parallel relation with respect to the longitudinal axis A and being equally spaced on each side of the axis A. Also fixedly secured to the members 19, as by welding or like means, are four contact blocks 21 as best seen in FIGURES 1, 3 and 4. The blocks 21 are rectangular in cross-section, their configuration and function will be explained as the disclosure progresses.

The cradle assembly 18 includes a pair of laterally extending cross-members 22 having a bowed or arcuate configuration. The members 22 are supported on rollers 23 carried by the carriage assembly 17 as best seen in FIGURE 4 and function to allow roll movements to be imparted to the cradle assembly 18 and components mounted thereon. Carried by the cross-members 22 are a pair of rails 24—24 having a parallel relation with respect to the axis A and are equally spaced on each side of the axis A. The rails 24 are of I-beam configuration in cross-section and receive roller assemblies (not shown) on their upper flanges (surfaces), it is on these roller assemblies that components carried by the trailer 11 are physically mounted.

Fixedly secured to the carriage assembly 17 adjacent each corner thereof is a U-shaped support member 26. The members 26 are in fact attached to cross-members 25 of the carriage assembly 17 and the distance between the members 26, located respectively on the same side of the axis A, is equal to the distance between the blocks 21 also located on one side of the axis A. As mounted on the assembly 17 the corresponding legs of the U-shaped members 26 are located in common planes. The inside surface of the upper leg of each of the U-shaped members 26 is finished, this is also true of the upper surfaces of the contact blocks 21.

As assembled the blocks 21 are received in the U-shaped members 26 with the inside surface of the upper legs of the members 26 contacting the upper surfaces of the blocks 21. It will now be seen that the carriage assembly 17 is supported by means of the members 26, blocks 21, and indirectly by the side members 19, the latter members and frame 15 being raised and lowered by the elevating mechanisms 16. The aforementioned finished surfaces, that is the inside surfaces of the upper legs of the members 26 and the upper surfaces of the blocks 21, may be finished to any degree desired or required to minimize friction therebetween.

The blocks 21 have a vertical bore 28 extending therethrough, the axis of the bore 28 having a normal relation with respect to the upper finished surface thereof and has a reduced diameter at its lower end to provide a seat or bearing surface 29. A pin 31 is mounted in the bore 28, the lower end of the pin being supported on the surface 29 while its upper end terminates short of the finished surface on the block 21. A threaded bore 32 is provided in the pin 31, the bore having a normal relation with respect to the axis of the pin 31. Mounted in the bore 32 is a bolt-like member 33. The plane ends of the members 33 are attached to the members 26 by semispherical and nut means substantially as shown in FIGURE 5. The other ends of the members 33 are located outside the members 26, accordingly their head ends are readily accessible for imparting rotational movement thereto.

Longitudinal movement of the carriage and cradle assemblies 17 and 18 with respect to the base frame assembly 14 is precluded by a bar and pin combination 38 (FIGURE 2). An elongated bar 39, secured to a cross-member extending between a pair of opposed elevating mechanisms 16, has an elongated slot 41 formed therein. A pin 42, secured to the carriage assembly 17 is received in the groove 41 and functions to arrest longitudinal movement of the assemblies 17 and 18 with respect to the base assembly 14 but allows lateral movement therebetween.

Clearance is provided to allow relative movement of the members 33 with respect to the side members 19, blocks 21 and members 26 as indicated by the numerals 34, 37 and 40, respectively. It will now be apparent that lateral movement may be imparted to the rail members 24, within limits allowed by the U-shaped members 26, by equal and identical rotation of the members 33. For reasons explained in the following paragraph, the members 33 are provided only on one side of the trailer 11.

Further, it will be apparent that yaw movements may also be imparted to the rail members 25. For example, if lateral movement is imparted to assemblies 17 and 18, located at one end of the trailer 11 only, either to the right or left with respect to the axis A and the positions of the assemblies 17 and 18, located at the other end of the trailer 11, are not disturbed except for small movements imparted thereto by movement of the first mentioned assemblies 17 and 18, the rails 24 will be yawed with respect to the axis A. To impart the aforementioned lateral and yaw movements it will be seen that the members 33 need only be provided on one side of the trailer 11.

Lateral movement is imparted to the assemblies 17 and 18, consequently to components carried by the trailer 11, by simultaneously rotating the bolt-like members 33 either in a clockwise or counter-clockwise direction. Yaw movements are imparted to the assemblies 17 and 18 by rotating only one of the bolt-like members 33 in either a clockwise or counter-clockwise direction. At such times as one of the bolt-like members 33 is being rotated the other bolt-like member functions to render the ends of the assemblies 17 and 18 (adjacent the member 33 not being rotated) non-movable with respect to the base frame assembly 14. In this respect, the structure as disclosed allows a yawing movement of six degrees (6°) to be imparted to the rail members 24 with respect to the longitudinal axis A of the equipment as shown in FIGURE 2.

It will now be seen that structure has been disclosed adapted to impart lateral and yaw movements to components mounted on material handling equipment which is simpler in design and far less bulky than conventional equipment, for example "basket-in-a-basket" type of construction supporting a cradle assembly in a carriage assembly.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed:

1. In material handling equipment including an elongated frame assembly, cradle and carriage assemblies and in which said frame assembly embodies a pair of spaced parallel side members, means for mounting said cradle and carriage assemblies on said frame assembly for lateral and angular movement thereon, comprising: individual contact members each defining a plane surface; said contact members being fixedly secured to the side members of said frame assembly at each corner of the latter; U-shaped members fixedly secured to said cradle assembly, the leg portions of said U-shaped members being rectangular in cross-section; said cradle and carriage assemblies being mounted on said frame assembly with the legs of said U-shaped members embracing said contact members whereby the plane surfaces of said contact members have a firm contacting relation with respect to the inner surfaces of the legs of said U-shaped members associated with each contact member; and the inner surfaces of said legs exceeding said plane surfaces thereby allowing angular movement of at least 6° to be imparted to said cradle and carriage assemblies with respect to said frame assembly while full contacting relation is maintained between said plane surfaces and the inner surfaces of the legs of said U-shaped members.

2. In material handling equipment as set forth in claim 1: including mating means attached to said frame assembly and cradle and carriage assemblies functioning to arrest longitudinal movement of said cradle and carriage assemblies with respect to said frame assembly.

3. In material handling equipment symmetrically constructed about a longitudinal axis thereof comprising a frame assembly including a pair of side members having a spaced parallel relation with respect to said longitudinal axis and cradle and carriage assemblies, means for mounting said cradle and carriage assemblies on said frame assembly for lateral and angular movement thereon comprising: a plurality of contact members each having a plane surface; said contact members being fixedly secured to said side members with said plane surfaces positioned in a common plane; U-shaped members the leg portions of which are rectangular in cross-section; said U-shaped members being fixedly secured to said cradle assembly with corresponding legs of said U-shaped members being located in common planes; said cradle and carriage assemblies being mounted on said frame assembly with said contact members received between the legs of said U-shaped members with an inner surface of the legs of said U-shaped members contacting the plane surfaces of said contact members; the area of the inner surfaces of said U-shaped members exceeding the area of said plane surfaces; first means mounted on predetermined ones of said U-shaped members whereby angular movement of at least 6° may be imparted to said cradle and carriage assemblies with respect to said frame assembly while full contacting relation is maintained between said plane surfaces and the inner surfaces of said U-shaped members; second means attached to said cradle and carriage assemblies and a cross member of said frame assembly functioning to arrest longitudinal movement of said cradle and carriage assemblies with respect to said frame assembly, and in which said first means includes pin members mounted in predetermined ones of said contact members for pivotal movement about a vertical axis therein; said pin members having threaded bores formed therein the axes of which are normal to the axes of said pin members; threaded bolt-like members mounted in said threaded bores with the plain end thereof attached to said cradle and carriage assemblies and the head ends thereof being positioned outboard with respect to said U-shaped members.

4. In material handling equipment as set forth in claim 3: in which said second means constitutes a guide member having an elongated slot formed therein and pin means positioned in said slot.

References Cited in the file of this patent
UNITED STATES PATENTS

| | | |
|---|---|---|
| 2,867,334 | Aiken | Jan. 6, 1959 |
| 2,920,773 | Knabe | Jan. 12, 1960 |